(12) United States Patent (10) Patent No.: US 6,991,873 B2
Sakai et al. (45) Date of Patent: Jan. 31, 2006

(54) NON-AQUEOUS ELECTROLYTE CELL (75) Inventors: Hideki Sakai, Kanagawa (JP); Yuzuru Fukushima, Miyagi (JP); Junji Kuyama, Kanagawa (JP); Mamoru Hosoya, Kanagawa (JP)

(73) Assignee: Sony Corporation, Tokyo (JP)

( * ) Notice: Subject to any disclaimer, the term of this patent is extended or adjusted under 35 U.S.C. 154(b) by 126 days.

(21) Appl. No.: 09/971,912

(22) Filed: Oct. 5, 2001

(65) Prior Publication Data
US 2002/0150816 A1 Oct. 17, 2002

(30) Foreign Application Priority Data
Oct. 6, 2000 (JP) .......................... P2000-308303

(51) Int. Cl.
*H01M 4/00* (2006.01)
*H01M 6/10* (2006.01)
*H01M 4/36* (2006.01)
*H01M 4/52* (2006.01)
*H01M 4/58* (2006.01)

(52) U.S. Cl. .................. 429/94; 429/221; 429/224; 429/231.8

(58) Field of Classification Search ................ 429/221, 429/231.8, 94, 224, 133
See application file for complete search history.

(56) References Cited

U.S. PATENT DOCUMENTS

| | | | | |
|---|---|---|---|---|
| 4,333,994 A | * | 6/1982 | Urry ............................ | 429/94 |
| 4,663,247 A | * | 5/1987 | Smilanich et al. ............. | 429/94 |
| 5,571,632 A | * | 11/1996 | Teramoto ..................... | 429/94 |
| 5,686,203 A | * | 11/1997 | Idota et al. .................. | 429/194 |
| 5,910,382 A | * | 6/1999 | Goodenough et al. ... | 429/218.1 |
| 5,916,707 A | * | 6/1999 | Omaru et al. ................ | 429/163 |

* cited by examiner

*Primary Examiner*—Patrick Joseph Ryan
*Assistant Examiner*—Julian Mercado
(74) *Attorney, Agent, or Firm*—Sonnenschein, Nath & Rosenthal LLP (57) ABSTRACT

A non-aqueous electrolyte cell having high discharge capacity, an improved capacity upkeep ratio and optimum cyclic characteristics. The non-aqueous electrolyte cell has a cell device including a strip-shaped cathode material and a strip-shaped anode material, layered and together via a separator and coiled a plural number of times, a non-aqueous electrolyte solution, and a cell can for accommodating cell device and the non-aqueous electrolyte solution. The cathode employs a cathode active material containing a compound of the olivinic structure represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, with the compound being used either singly or in combination with other materials. The ratio of an inner diameter d to an outer diameter D of cell device is selected so that $0.05 < d/D < 0.5$.

8 Claims, 2 Drawing Sheets

NON-AQUEOUS ELECTROLYTE CELL

RELATED APPLICATION DATA

The present application claims priority to Japanese Application(s) No(s). P2000-308303 filed Oct. 6, 2000, which application(s) is/are incorporated herein by reference to the extent permitted by law.

BACKGROUND OF THE INVENTION

1. Field of the Invention

This invention relates to a non-aqueous electrolyte cell employing a cell device obtained on layering and coiling a strip-shaped cathode material and a strip-shaped anode material together. More particularly, it relates to improvement in a cell device.

2. Description of Related Art

Nowadays, in keeping up with the recent marked progress in the electronic equipment, researches into re-chargeable cells, as power sources usable conveniently and economically for prolonged time, are underway. Representative of the cells are lead accumulators, alkali accumulators and non-aqueous electrolyte cells.

Of the above cells, lithium ion secondary cells, as non-aqueous electrolyte cells, have such merits as high output and high energy density.

The lithium ion secondary cells are made up of a cathode and an anode, including active materials capable of reversibly doping/dedoping lithium ions, and a non-aqueous electrolyte. The charging reaction of the lithium ion cell proceeds as lithium ions are deintercalated into an electrolyte solution at the cathode and are intercalated into the anode active material. In discharging, reaction opposite to that of the charging reaction proceeds, such that lithium ions are interecalated at the cathode. That is, charging/discharging is repeated as the reaction of entrance/exiting of lithium ions from the cathode into the anode active material and from the anode active material occurs repeatedly.

Currently, $LiCoO_2$, $LiNiO_2$ or $LiMn_2O_4$ are used as the cathode active material of the lithium ion secondary cell because these materials exhibit a high energy density and a high voltage.

However, if the aforementioned active material is used, both the cathode material and the anode material undergo volumetric expansion and contraction, during charging and discharging, respectively, thus producing marked volumetric changes. Thus, if, in case of a cell accommodating the electrolyte solution and the cell device in an iron cell can, the cathode and anode materials are layered and coiled together to form a cell device, the cathode and anode materials are coiled to too small an inner diameter, the layers of the cathode active material or the anode active material in the vicinity of the center of the coil tend to be deteriorated, peeled of or detached due to the volumetric changes of the cell device during charging/discharging, thus causing internal shorting or deteriorating the volumetric upkeep ratio to render it impossible to realize satisfactory cyclic characteristics.

Moreover, depending on the structure of the cell device, specifically the value of the ratio of the inner diameter d to the outer diameter D, or d/D, the amount of the active material introduced into the cell device cannot be counterbalanced with respect to the amount of the electrolyte solution to render it impossible to realize a high discharge capacity.

SUMMARY OF THE INVENTION

It is therefore an object of the present invention to provide a non-aqueous electrolyte cell which, when the cathode and anode materials are layered and coiled together to form a cell device, which is then housed in a cell can along with the electrolyte solution, is of high capacity and is improved in the volumetric upkeep ratio.

The present invention provides a non-aqueous electrolyte cell comprising a cell device including a strip-shaped cathode material and a strip-shaped anode material, which are layered via a separator and coiled a plural number of times, a non-aqueous electrolyte solution, and a cell can for accommodating the cell device and the non-aqueous electrolyte solution, wherein said cathode material employs a cathode active material containing a compound of an olivinic structure represented by a general formula $Li_xFe_{1-y}M_yPO_4$, where M is at least one selected from a group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, which compound is used either singly or in combination with other materials, and wherein a ratio of an inner diameter d to an outer diameter D of said cell device is $0.05 < d/D < 0.5$.

With the non-aqueous electrolyte cell according to the present invention, the aforementioned compound used in the cathode active material suppresses volumetric changes of the cell device in charging/discharging to enable the inner diameter of the coiled cell device to be reduced. Thus, according to the present invention, in which the aforementioned compound is used as the cathode active material and by setting a preset range for the ratio of the inner diameter d to the outer diameter D of the cell device, a high discharge capacity as well as a high capacity upkeep ratio may be achieved.

DESCRIPTION OF THE PREFERRED EMBODIMENTS

Referring to the drawings, certain preferred embodiments of the present invention will be explained in detail.

Figure 1:
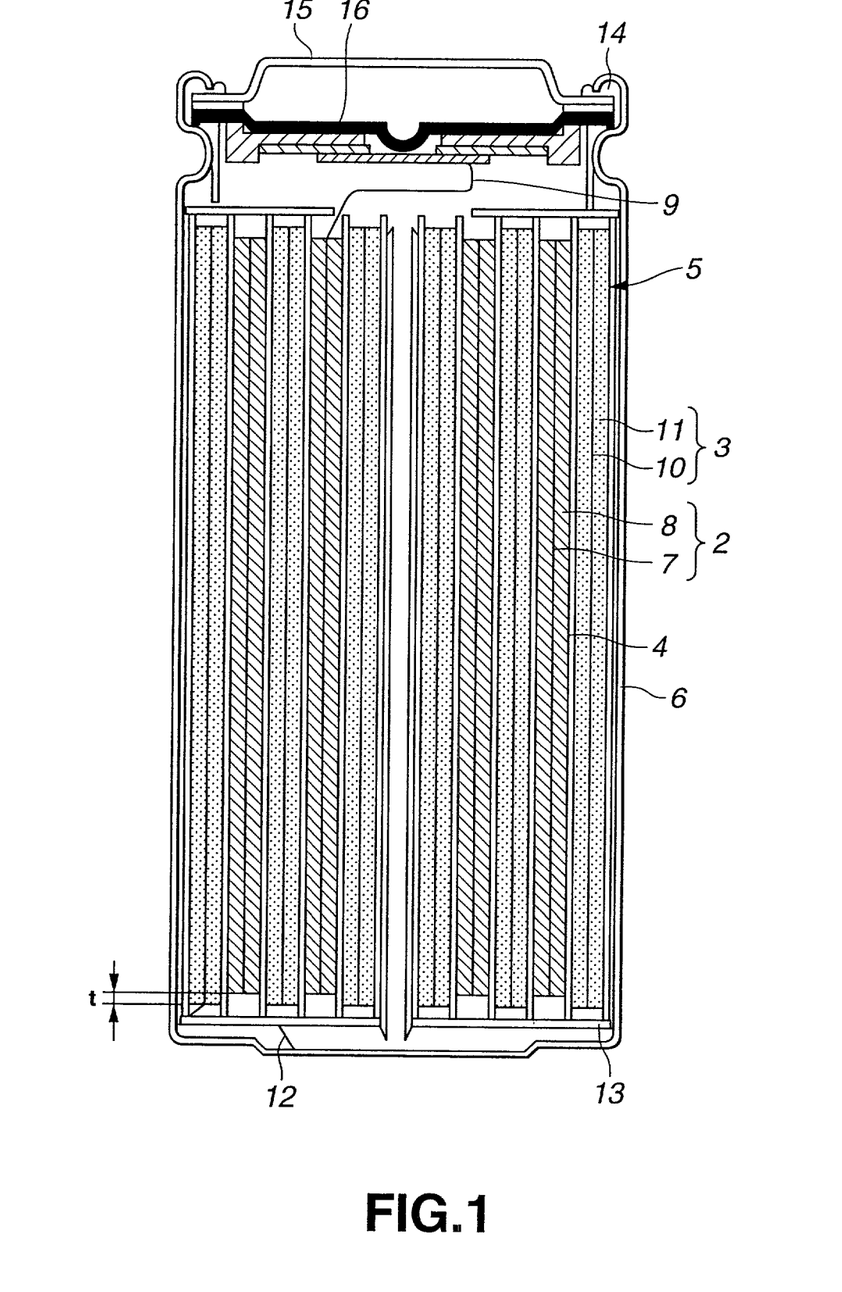
FIG. 1 is a cross-sectional view showing a non-aqueous electrolyte cell embodying the present invention, with a portion thereof being broken away.

Referring to FIG. 1, a non-aqueous electrolyte cell 1 includes a strip-shaped cathode material 2 and a strip-shaped anode material 3, layered together via a separator 4, and spirally coiled a plural number of times to form a cell device 5, which is housed along with the non-aqueous electrolyte solution in a cell can 6.

The cathode material 2 is made up of a cathode current collector 7, formed e.g., by an aluminum foil, on both sides of which are formed layers of a cathode active material 8 containing a cathode active material capable of reversibly electrically emitting and occluding lithium. A cathode lead 9 is mounted in the vicinity of one end of the cathode material 2.

The cathode active material contained in the layers of the cathode active material 8 is a compound of an olivinic crystal structure represented by the general formula $Li_xFe_{1-y}M_yPO_4$ where m denotes at least one of Mn, Cr, Co, Cu, Ni, V, Mo, Ti, Zn, Al, Ga, Mg, B and Nb, with $0.05 \leq x \leq 1.2$ and $0 \leq y \leq 0.8$. This compound may be used either alone or in combination. In the present embodiment, a composite material composed of $LiFePO_4$ as later explained in detail and a carbon material is used as a cathode active material. In the following, a case of using $LiFePO_4$ as $Li_xFe_{1-y}M_yPO_4$ and of using a composite material of $LiFePO_4$ and a carbon material as cathode active material is explained.

The composite material of $LiFePO_4$ and a carbon material, referred to below simply as $LiFePO_4$ carbon composite material, is such a material composed of $LiFePO_4$ particles on the surfaces of which are attached numerous particles of the carbon material having the particle size appreciably smaller than the particle size of the $LiFePO_4$ particles. Since the carbon material is electrically conductive, the $LiFePO_4$ carbon composite material, composed of the carbon material and $LiFePO_4$ is higher in electronic conductivity than a cathode active material composed e.g., only of $LiFePO_4$. That is, since the $LiFePO_4$ carbon composite material is improved in electronic conductivity due to the carbon particles attached to the $LiFePO_4$ particles, the capacity proper to $LiFePO_4$ can be sufficiently manifested. Thus, by using the $LiFePO_4$ carbon composite material as the cathode active material, the non-aqueous electrolyte cell 1 having a high capacity can be achieved.

The carbon content per unit weight in the $LiFePO_4$ carbon composite material is desirably not less than 3 wt %. If the carbon content per unit weight of the $LiFePO_4$ carbon composite material is less than 3 wt %, the amount of carbon particles attached to $LiFePO_4$ may be insufficient so that no favorable effect in improving the electronic conductivity may be realized satisfactorily.

As the carbon material forming the $LiFePO_4$ carbon composite material, such a material is preferably used which has an intensity area ratio of diffracted beams appearing at the number of waves of 1570 to 1590 $cm^{-1}$ to the diffracted beams appearing at the number of waves of 1340 to 1360 $cm^{-1}$ in the Raman spectrum of graphite in the Raman spectroscopy, or the ratio A(D/G), equal to 0.3 or higher.

Figure 2:
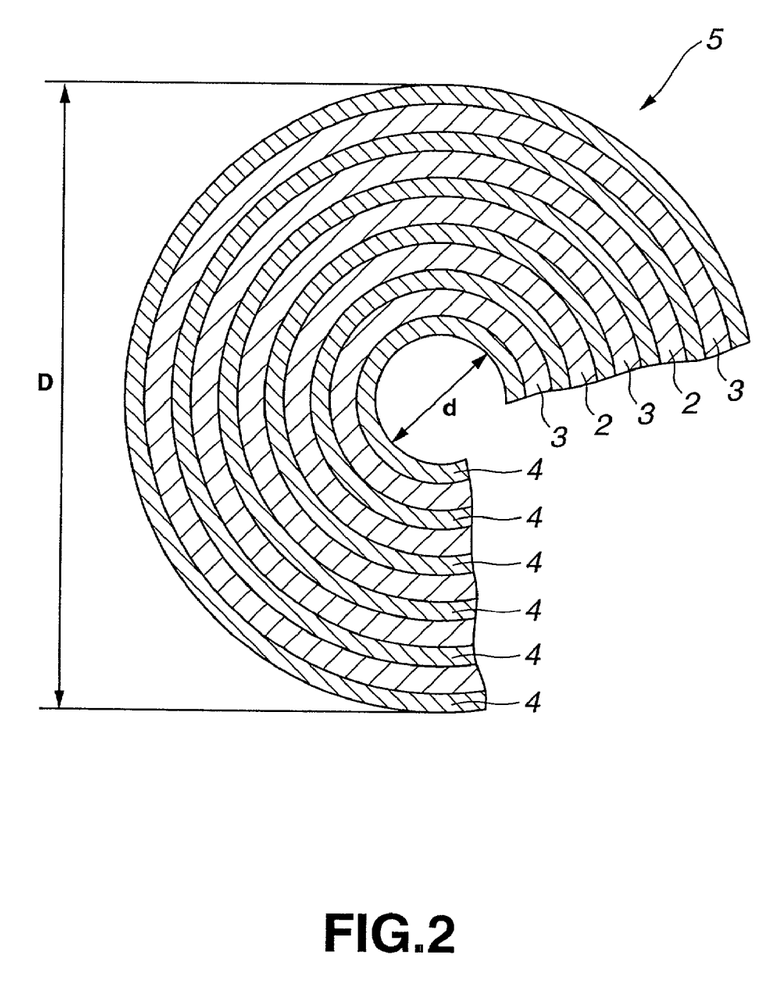
FIG. 2 is a cross-sectional view showing essential portions of a cell device of the cell shown in FIG. 1.

The strength area ratio A(D/G) is defined as being a background-free Raman spectral intensity area ratio A(D/G) of a G-peak appearing at the number of waves of 1570 to 1590 $cm^{-1}$ and a D-peak appearing at the number of waves of 1340 to 1360 $cm^{-1}$ as measured by the Raman spectroscopic method as shown in FIG. 2. The expression "background-free" denotes the state free from noisy portions.

Among the numerous peaks of the Raman spectrum of Gr, two peaks, namely a peak termed a G-peak appearing at the number of waves of 1570 to 1590 $cm^{-1}$ and a peak termed a D-peak appearing at the number of waves of 1340 to 1360 $cm^{-1}$, as discussed above, may be observed. Of these, the D-peak is not a peak inherent in the G-peak, but is a Raman inactive peak appearing when the structure is distorted and lowered in symmetry. So, the D-peak is a measure of a distorted structure of Gr. In a known manner, the intensity area ratio A (D/G) of the D- and G-peaks is proportionate to a reciprocal of the crystallite size La along the axis of a of Gr.

As such carbon material, an amorphous carbon material, such as acetylene black, is preferably employed.

The carbon material having the intensity area ratio A (D/G) not less than 0.3 may be obtained by processing such as comminuting with a pulverizing device. A carbon material having an arbitrary ratio A (D/G) may be realized by controlling the pulverizing time duration.

For example, graphite, as a crystalline carbon material, may readily be destroyed in its structure by a powerful pulverizing device, such as a planetary ball mill, and thereby progressively amorphized, so that the intensity area ratio A (D/G) is concomitantly increased. That is, by controlling the driving time duration of a pulverizing device, such a carbon material having a desired A (D/G) value not less than 0.3 may readily be produced. Thus, subject to pulverization, a crystalline carbon material may also be preferably employed as a carbon material.

The powder density of the $LiFePO_4$ carbon composite material is preferably not less than 2.2 $g/cm^3$. If the material for synthesis of the $LiFePO_4$ carbon composite material is milled to such an extent that the powder density is not less than 2.2 $g/cm^3$, the resulting $LiFePO_4$ carbon composite material is comminuted sufficiently so that a non-aqueous electrolyte cell 1 having a higher charging ratio of the cathode active material and a high capacity may be realized. Moreover, since the $LiFePO_4$ carbon composite material is comminuted to satisfy the aforementioned powder density, its specific surface may be said to be increased. That is, a sufficient contact area may be maintained between $LiFePO_4$ and the carbon material to improve the electronic conductivity.

If the powder density of the $LiFePO_4$ carbon composite material is less than 2.2 $g/cm^3$, the $LiFePO_4$ carbon composite material is not compressed sufficiently, so that there is a risk that the packing ratio of the active material cannot be improved at the cathode material 2.

On the other hand, the Brunauer-Eimnet-Teller (BET) specific surface area in the $LiFePO_4$ carbon composite material is preferably not less than 10.3 $m^2/g$. If the BET specific surface area of the $LiFePO_4$ carbon composite material is not less than 10.3 $m^2/g$, the surface area of $LiFePO_4$ per unit weight can be sufficiently increased to increase the contact area between $LiFePO_4$ and the carbon material to improve the electronic conductivity of the cathode active material satisfactorily.

The primary particle size of the $LiFePO_4$ carbon composite material is preferably not larger than 3.1 $\mu m$. By the primary particle size of the $LiFePO_4$ carbon composite material being not larger than 3.1 $\mu m$, the surface area of $LiFePO_4$ per unit area may be sufficiently increased to increase the contact area between $LiFePO_4$ and the carbon material to improve the electronic conductivity of the cathode active material.

In the present embodiment, the $LiFePO_4$ carbon composite material is used as the cathode active material. However, the present invention is not limited thereto. In the present invention, $LiFePO_4$ by itself may be used as the cathode active material, ora compound represented by the general formula $Li_xFe_{1-y}M_yPO_4$, other than $LiFePO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, may be used as the cathode active material either singly or in combination with other materials. These compounds may be enumerated by, for example, $LiFe_{0.2}Mn_{0.8}PO_4$, $LiFe_{0.2}Cr_{0.8}PO_4$, $LiFe_{0.2}Co_{0.8}PO_4$, $LiFe_{0.2}Cu_{0.8}PO_4$, $LiFe_{0.2}Ni_{0.8}PO_4$, $LiFe_{0.25}V_{0.75}PO_4$, $LiFe_{0.25}Mo_{0.75}PO_4$, $LiFe_{0.25}Ti_{0.75}PO_4$, $LiFe_{0.3}Zn_{0.7}PO_4$, $LiFe_{0.3}Al_{0.7}PO_4$, $LiFe_{0.3}Ga_{0.7}PO_4$, $LiFe_{0.25}Mg_{0.75}PO_4$, $LiFe_{0.25}B_{0.75}PO_4$ and $LiFe_{0.25}Nb_{0.75}PO_4$.

The binder contained in the layer of the cathode active material may be formed of any suitable known resin material routinely used as the binder for the layer of the cathode active material for this sort of the non-aqueous electrolyte cell.

An anode material 3 is made up of an anode current collector 10, formed e.g., by a nickel foil or a copper foil, and a layer of an anode active material 11 formed on each surface of the anode current collector 10. An anode lead 12 is mounted to the vicinity of the anode material 3.

The anode active material of the layer of the anode active material 11 is such a material capable of doping/dedoping lithium. As thus anode active material, capable of doping/dedoping lithium, metal lithium, lithium alloys, lithium-doped electrically conductive high molecular materials, carbonaceous materials or layered compounds, such as metal oxides, can be used. The binder contained in the layer of the anode active material 11 may be any suitable known binder routinely used in this sort of the non-aqueous electrolyte cell.

In the non-aqueous electrolyte cell 1, if the positions of the width-wise ends of the anode material 3 are coincident with or inwardly offset with respect to the width-wise ends of the cathode material 2, lithium ions emitted from the cathode material 2 in the vicinity or on the outer side of the width-wise ends of the anode material 3 during charging tend to be affected in charging/discharging balance at both width-wise ends of the anode material 3, with the lithium ions being then precipitated as metal lithium obstructing the charging/discharging reaction to render it impossible to produce sufficient charging/discharging cyclic characteristics.

Thus, in the non-aqueous electrolyte cell 1, the anode material 3 is set so as to be of broader width than the cathode material 2 to render it difficult for the lithium ions to be affected in charging/discharging balance in the portions of the anode material 3 facing the both width-wise ends or the vicinity of the both width-wise ends of the cathode material 2 to render the precipitation of the lithium ions difficult. In the non-aqueous electrolyte cell 1, since the amount of Li emitted in charging to a high potential exceeding 4 V is appreciably smaller with $LiFePO_4$ used as its cathode active material than with 4V class cathode active material, such as $LiCoO_2$, metal lithium is less liable to be precipitated in the portions of the anode material 3 facing both width-wise ends or the vicinity of the width-wise ends of the cathode material 2.

If one end of the anode material 3 is larger by 0.05 mm or more than the corresponding end of the cathode material 2, charging/discharging may be obtained, whereas, if the one end of the anode material 3 is larger by less than 0.05 mm than the corresponding end of the cathode material 2, the end of the anode material 3 tends to be coincident with or inwardly offset with respect to the corresponding end of the cathode material 2. If the width at one end of the anode material 3 is larger by 2.0 mm or more than the that at the corresponding end of the cathode material 2, the amount of the anode active material not contributing to the cell reaction is increased to lower the energy density of the cell. It is therefore desirable that the anode material 3 is broader in width than the cathode material 2 so that a difference t in the width-wise dimension on one side shown in FIG. 1 be in a range of 0.05 mm to 2.0 mm.

The separator 4 serves for separating the layer of the cathode active material 8 of the cathode material 2 from the layer of the anode active material 11 of the anode material 3, and may be formed by a film of any suitable known material routinely used as a separator for this sort of the non-aqueous electrolyte cell, such as, for example, a film of a high molecular material, e.g., polypropylene. The separator 4 needs to be as thin in thickness as possible in view of the relation between the lithium ion conductivity and the energy density. Specifically, the separator thickness of, for example, 50 μm or less, is desirable.

In the non-aqueous electrolyte cell 1, the aforementioned cathode material 2 and the anode material 3 are layered together via separator 4, and coiled a plural number of times to form the cell device 5, as shown in FIGS. 1 and 2. The cell device 5 is produced by coiling the cathode material 2 and the anode material 3 so that the ratio of the inner diameter d to its outer diameter D, or d/D, will be such that $0.05 \leq d/D \leq 0.5$. The non-aqueous electrolyte cell 1 uses $LiFePO_4$, having the olivinic crystal structure, as the cathode active material, as discussed above. This $LiFePO_4$ has properties opposite to those of the carbon material used for an anode active material, that is the properties that its crystal lattice volume is decreased and increased during the charging when Li is dedoped and during discharge when Li is doped, respectively. Thus, in the non-aqueous electrolyte cell 1, the cell device 5 undergoes volumetric changes due to charging/discharging only to a lesser extent than if a conventional material such as $LiCoO_2$ is used as the cathode active material. Thus, if the inner diameter d of the cell device 5 is decreased, with its outer diameter D remaining unchanged, and the charging/discharging is performed a plural number of times, deterioration of electro-chemical properties, peeling or detachment of the active material due to volumetric expansion or contraction of the device may be suppressed to improve the capacity upkeep ratio to realize optimum cyclic characteristics.

The reason of setting the ratio of the inner diameter d to its outer diameter D, or d/D, so that $0.05 < d/D < 0.5$, is that, if the ratio is not less than 0.5, the inner diameter d is so large that an excess amount of the electrolyte solution is introduced, whilst an amount necessary and sufficient for the cell reaction cannot be charged so that the practical capacity of the cell cannot be maintained. The reason of setting the lower limit of the ratio d/D of the inner diameter d and the outer diameter D to 0.05 is that, if the ratio is larger than 0.05, the aforementioned deterioration of electrochemical properties, peeling or detachment of the active material due to volumetric expansion or contraction of the device is not produced, whereas, if the ratio is not larger than 0.05, the aforementioned deterioration of electro-chemical properties, peeling or detachment of the active material is actually produced.

As the non-aqueous electrolyte solution, such a solution obtained on dissolving an electrolyte in a non-protonic aqueous solvent is used.

As the non-aqueous solvent, propylene carbonate, ethylene carbonate, butylene carbonate, vinylene carbonate, γ-butyrolactone, sulfolane, 1,2-dimethoxyethane, 1, 2-diethoxyethane, 2-methyl tetrahydrofuran, 3-methyl-1,3-dioxolane, methyl propionate, methyl butylate, dimethyl carbonate, diethyl carbonate and dipropyl carbonate, for example, may be used. In view of voltage stability, cyclic carbonates, such as propylene carbonate, ethylene carbonate, butylene carbonate or vinylene carbonate, and chained carbonates, such as dimethyl carbonate, diethyl carbonate and dipropyl carbonate, are preferably used. These non-aqueous solvents may be used alone or in combination.

As the electrolytes dissolved in the non-aqueous solvent, lithium salts, such as $LiPF_6$, $LiClO_4$, $LiAsF_6$, $LiBF_4$, $LiCF_3SO_3$ or $LiN(CF_3SO_2)_2$, may be used. Of these lithium salts, $LiPF_6$ and $LiBF_4$ are preferred.

The cell can 6, the inner surface of which is plated with nickel, is used for housing the cell device 5 and the non-aqueous electrolyte.

The method for the preparation of the non-aqueous electrolyte cell 1, constructed as described above, is hereinafter explained.

First, a composite material of LiFePO$_4$ and the carbon material, as a cathode active material, is synthesized by a manufacturing method as now explained.

For synthesizing the cathode active material, LiFePO$_4$ as a starting material for synthesis is kneaded together, milled and sintered. At an optional time point in the course of the mixing, milling and sintering, a carbon material is added to the kneaded starting materials for synthesis. As the LiFePO$_4$ starting materials for synthesis, Li$_3$PO$_4$Fe$_3$(PO$_4$)$_2$ or a hydrate Fe$_3$(PO$_4$)$_2$.nH$_2$O thereof where n denotes the number of hydrates, are used.

In the following, such a case is explained in which lithium phosphate Li$_3$PO$_4$ and a ferrous phosphate octahydrate Fe$_3$(PO$_4$)$_2$.8H$_2$O thereof, synthesized as explained below, are used as starting materials for synthesis, and in which, after adding a carbon material to these starting materials for synthesis, a number of process steps are carried out to synthesize the LiFePO$_4$ carbon composite material.

First, the LiFePO$_4$ starting materials for synthesis and the carbon material are mixed together to form a mixture by way of a mixing step. The mixture from the mixing step is then milled by a milling process, and the milled mixture then is sintered by way of performing a sintering process.

In the mixing process, lithium phosphate and ferrous phosphate octahydrate are mixed together at a pre-set ratio and further added to with a carbon material to form a mixture.

This ferrous phosphate octahydrate, used as a starting material for synthesis, is synthesized by adding disodium hydrogen phosphate dodecahydrate (2Na$_2$HPO$_4$.12H$_2$O) to an aqueous solution obtained on dissolving ferrous phosphate heptahydrate (FeSO$_4$.7H$_2$O) in water and by allowing the resulting mass to dwell for a pre-set time. The reaction of synthesis of ferrous phosphate octahydrate may be represented by the following chemical formula (1):

$3FeSO_4.7H_2O+2Na_2HPO_4.12H_2O \rightarrow$
$Fe_3(PO_4)_2.8H_2O+2Na_2SO_4+37H_2O$     (1).

In ferrous phosphate octahydrate, as the material for synthesis, there is contained a certain amount of Fe$^{3+}$ from the synthesis process. If Fe$^{3+}$ is left in the material for synthesis, a trivalent Fe compound is generated by sintering to obstruct single-phase synthesis of the LiFePO$_4$ carbon composite material. It is therefore necessary to add a reducing agent to the starting materials for synthesis prior to sintering and to reduce Fe$^{3+}$ contained in the starting materials for synthesis to Fe$^{2+}$ at the time of sintering.

However, there is a limitation to the capability of the reducing agent in reducing Fe$^{3+}$ to Fe$^{2+}$ by the reducing agent, such that, if the content of Fe$^{3+}$ in the starting materials for synthesis is excessive, it may be an occurrence that Fe$^{3+}$ is not reduced in its entirety but is left in the LiFePO$_4$ carbon composite material.

It is therefore desirable that the content of Fe$^{3+}$ in the total iron in the ferrous phosphate octahydrate be set to 61 wt % or less. By limiting the content of Fe$^{3+}$ in the total iron in the ferrous phosphate octahydrate to 61 wt % or less from the outset, single-phase synthesis of the LiFePO$_4$ carbon composite material can be satisfactorily achieved without allowing Fe$^{3+}$ to be left at the time of sintering, that is without generating impurities ascribable to Fe$^{3+}$.

It should be noted that, the longer the dwell time in generating ferrous phosphate octahydrate, the larger becomes the content of Fe$^{3+}$ in the generated product, so that, by controlling the dwell time so as to be equal to a preset time, ferrous phosphate octahydrate having an optional Fe$^{3+}$ can be produced. The content of Fe$^{3+}$ in the total iron in the ferrous phosphate octahydrate can be measured by the Mossbauer method.

The carbon material added to the starting materials for synthesis acts as a reducing agent for reducing Fe$^{3+}$ to Fe$^{2+}$, at the time of sintering, even if Fe$^{2+}$ contained in ferrous phosphate octahydrate as the starting materials for synthesis is oxidized to Fe$^{3+}$ by oxygen in atmosphere or due to sintering. Therefore, even if Fe$^{3+}$ is left in the starting materials for synthesis, impurities may be prevented from being generated to assure single-phase synthesis of the LiFePO$_4$ carbon composite material. Moreover, the carbon material acts as an antioxidant for preventing oxidation of Fe$^{2+}$ contained in the starting materials for synthesis to Fe$^{3+}$. That is, the carbon material prevents oxidation to Fe$^{3+}$ of Fe$^{2+}$ by oxygen present in atmosphere and in a sintering oven prior to or during sintering.

That is, the carbon material acts not only as an electrification agent for improving the electronic conductivity of the cathode active material but also as a reducing agent and as an antioxidant. Meanwhile, since this carbon material is a component of the LiFePO$_4$ carbon composite material, there is no necessity of removing the carbon material following synthesis of the LiFePO$_4$ carbon composite material. The result is the improved efficiency in the preparation of the LiFePO$_4$ carbon composite material.

It is noted that the carbon content per unit weight of the LiFePO$_4$ carbon composite material be not less than 3 wt %. By setting the carbon content per unit weight of the LiFePO$_4$ carbon composite material to not less than 3 wt %, it is possible to utilize the capacity and cyclic characteristics inherent in LiFePO$_4$ to its fullest extent.

In the milling process, the mixture resulting from the mixing process is subjected to milling in which pulverization and mixing occur simultaneously. By the milling herein is meant the powerful comminuting and mixing by a ball mill. As the ball mill, a planetary ball mill, a shaker ball mill or a mechano-fusion may selectively be employed.

By milling the mixture from the mixing process, the starting materials for synthesis and the carbon material can be mixed homogeneously. Moreover, if the starting materials for synthesis is comminuted by milling, the specific surface area of the starting materials for synthesis can be increased, thereby increasing the contact points of the starting materials for synthesis to accelerate the synthesis reaction in the subsequent sintering process.

It is desirable that, by milling the mixture containing the starting materials for synthesis, the particle size distribution of the particle size not less than 3 $\mu$m be not larger than 22% in terms of the volumetric integration frequency. With the particle size distribution of the starting materials for synthesis in the above range, the starting materials for synthesis has a surface area sufficient to produce surface activity for carrying out the synthesis reaction. Thus, even if the sintering temperature is of a low value of e.g., 600° C. which is lower than the melting point of the starting materials for synthesis, the reaction efficiency is optimum, thus realizing the single-phase synthesis of the LiFePO$_4$ carbon composite material satisfactorily.

Moreover, the milling is desirably executed so that the powder density of the LiFePO$_4$ carbon composite material will be 2.2 g/cm$^3$ or higher. By comminuting the starting materials for synthesis to give the above defined powder density, the specific surface area of LiFePO$_4$ and hence the contact area between LiFePO$_4$ and the carbon material can be increased to improve the electronic conductivity of the cathode active material.

Thus, by milling the mixture containing the starting material for synthesis, such a cathode active material can be produced which will give a high capacity non-aqueous electrolyte cell 1.

In the sintering step, the mixture obtained on compaction in the compression step is sintered. By sintering the mixture, lithium phosphate may be reacted with ferrous phosphate octahydrate to synthesize $LiFePO_4$.

The synthesis reaction of $LiFePO_4$ may be represented by the following reaction formula (2):

$$Li_3PO_4 + Fe_3(PO_4)_2 \cdot nH_2O \rightarrow 3LiFePO_4 + nH_2O \quad (2)$$

where n denotes the number of hydrates and is equal to 0 for an anhydride. In the chemical formula (2), $Li_3PO_4$ is reacted with $Fe_3(PO_4)_2$ or its hydrate $Fe_3(PO_4)_2 \cdot nH_2O$ where n denotes the number of hydrates.

As may be seen from the chemical formula (2), no by-product is yielded if $Fe_3(PO_4)_2$ is used as a starting materials for synthesis. On the other hand, if $Fe_3(PO_4)_2 \cdot nH_2O$ is used, water, which is non-toxic, is by-produced.

Heretofore, lithium carbonate, ammonium dihydrogen phosphate and ferrous acetate II, as syntheses materials, are mixed at a pre-set ratio and sintered to synthesize $LiFePO_4$ by the reaction shown by the chemical formula (3):

$$Li_2CO_3 + 2Fe(CH_3COO)_2 + 2NH_4H_2PO_4 \rightarrow 2LiFePO_4 + CO_2 + H_2O + 2NH_3 + 4CH_3COOH \quad (3)$$

As may be seen from the reaction formula (3), toxic by-products, such as ammonia or acetic acid, are generated on sintering with the conventional synthesis method for $LiFePO_4$, therefore, a large-scale equipment, such as gas collector, is required for processing these toxic by-products, thus raising the cost. In addition, the yield of $LiFePO_4$ is lowered because these by-products are generated in large quantities.

In the present non-aqueous electrolyte cell 1, in which $Li_3PO_4$, $Fe_3(PO_4)_2$ or its hydrate $Fe_3(PO_4)_2 \cdot nH_2O$, where n denotes the number of hydrates, is used as the starting material for synthesis, the targeted $LiFePO_4$ can be produced without generating toxic by-products. In other words, safety in sintering may be appreciably improved as compared to the conventional manufacturing method. Moreover, while a large-scale processing equipment is heretofore required for processing toxic by-products, the manufacturing method of the present invention yields only water, which is innoxious, as a by-product, thus appreciably simplifying the processing step to allow to reduce size of the processing equipment. The result is that the production cost can be appreciably lower than if ammonia etc which has to be processed is by-produced in the conventional system. Moreover, since the by-product is yielded only in minor quantities, the yield of $LiFePO_4$ may be improved significantly.

Although the sintering temperature in sintering the mixture may be 400 to 900° C. by the above synthesis method, it is preferably 600° C. or thereabouts in consideration of the cell performance. If the sintering temperature is less than 400° C., neither the chemical reaction nor crystallization proceeds sufficiently such that the phase of impurities such as $Li_3PO_4$ of the starting materials for synthesis may persist and hence the homogeneous $LiFePO_4$ may not be produced. If conversely the sintering temperature exceeds 900° C., crystallization proceeds excessively so that the $LiFePO_4$ particles are coarse in size to decrease the contact area between $LiFePO_4$ and the carbon material to render it impossible to achieve sufficient discharging capacity.

During sintering, Fe in the $LiFePO_4$ carbon composite material synthesized is in the bivalent state. So, in the temperature of the order of 600° C. as the synthesis temperature, Fe in the $LiFePO_4$ carbon composite material is promptly oxidized to $Fe^{3+}$ by oxygen in the sintering atmosphere in accordance with the chemical formula shown by the chemical formula (4) so that impurities such as trivalent Fe compounds are produced to obstruct the single-phase synthesis of the $LiFePO_4$ carbon composite material:

$$6LiFePO_4 + \frac{3}{2}O_2 \rightarrow 2Li_3Fe_2(PO_4)_3 + Fe_2O_3 \quad (4)$$

Then, inert gases, such as nitrogen or argon, or reducing gases, such as hydrogen or carbon monoxide, are used as the sintering atmosphere, while the oxygen concentration in the sintering atmosphere is prescribed to a range within which Fe in the $LiFePO_4$ carbon composite material is not oxidized, that is to not larger than 1012 ppm (volume). By setting the oxygen concentration in the sintering atmosphere to 1012 ppm (volume) or less, it is possible to prevent Fe from being oxidized even at the synthesis temperature of 600° C. or thereabouts to achieve the single-phase synthesis of the $LiFePO_4$ carbon composite material.

If the oxygen concentration in the sintering atmosphere is 1012 ppm in volume or higher, the amount of oxygen in the sintering atmosphere is excessive, such that Fe in the $LiFePO_4$ carbon composite material is oxidized to $Fe^{3+}$ to generate impurities to obstruct the single-phase synthesis of the $LiFePO_4$ carbon composite material.

As for takeout of the sintered $LiFePO_4$ carbon composite material, the takeout temperature of the sintered $LiFePO_4$ carbon composite material, that is the temperature of the $LiFePO_4$ carbon composite material exposed to atmosphere, is desirably 305° C. or lower. On the other hand, the takeout temperature of the sintered $LiFePO_4$ carbon composite material is more desirably 204° C. or lower. By setting the takeout temperature of the $LiFePO_4$ carbon composite material to 305° C. or lower, Fe in the sintered $LiFePO_4$ carbon composite material is oxidized by oxygen in atmosphere to prevent impurities from being produced.

If the sintered $LiFePO_4$ carbon composite material is taken out in an insufficiently cooled state, Fe in the $LiFePO_4$ carbon composite material is oxidized by oxygen in atmosphere, such that impurities tend to be produced. However, if the $LiFePO_4$ carbon composite material is cooled to too low a temperature, the operating efficiency tends to be lowered.

Thus, by setting the takeout temperature of the sintered $LiFePO_4$ carbon composite material to 305° C. or lower, it is possible to prevent Fe in the sintered $LiFePO_4$ carbon composite material from being oxidized by oxygen in atmosphere and hence to prevent impurities from being generated to maintain the operation efficiency as well as to synthesize the $LiFePO_4$ carbon composite material having desirable cell characteristics with high efficiency.

Meanwhile, the cooling of the as-sintered $LiFePO_4$ carbon composite material is carried out in a sintering furnace. The cooling method used may be spontaneous cooling or by forced cooling. However, if a shorter cooling time, that is a higher operating efficiency, is envisaged, forced cooling is desirable. In case the forced cooling is used, it is sufficient if a gas mixture of oxygen and inert gases, or only the inert gases, are supplied into the sintering furnace so that the oxygen concentration in the sintering furnace will be not higher than the aforementioned oxygen concentration, that is, 1012 ppm (volume) or less.

In the foregoing, the carbon material is added prior to the milling step. Alternatively, the carbon material may also be added after the milling step or after the sintering step.

However, if the carbon material is added after the sintering step, the reducing effect or the oxidation preventative effect during sintering cannot be obtained, such that the addition is useful only for improving the electrical conductivity. Thus, in case the carbon material is added after the sintering step, it becomes necessary to prevent $Fe^{3+}$ from being left over by other suitable measures.

It is noted that, if the carbon material is added after the sintering step, the product synthesized on sintering is not the $LiFePO_4$ carbon composite material but is $LiFePO_4$. So, milling is again applied after the carbon material is added to $LiFePO_4$ synthesized on sintering. By this second milling, the carbon material added is comminuted and hence is more liable to become attached to the surface of $LiFePO_4$. Moreover, by this second milling, $LiFePO_4$ and the carbon material are mixed sufficiently to permit the comminuted carbon material to be attached uniformly to the surface of $LiFePO_4$, thus, even in case the carbon material is added after sintering, it is possible to obtain a product similar to one obtained on addition of a carbon material prior to milling, that is the $LiFePO_4$ carbon composite material, as well as to achieve the favorable effect similar to that described above.

A non-aqueous electrolyte cell 1, employing the $LiFePO_4$ carbon composite material produced as described above, as the cathode active material, is prepared e.g., as follows.

As the cathode material 2, the $LiFePO_4$ carbon composite material as the cathode active material and a binder are dispersed in a solvent to prepare a slurried cathode mixture. The so produced cathode mixture is evenly coated on the cathode current collector 7 and dried in situ to form the layer of the cathode active material 8 to prepare the cathode material 2. As the binder for the cathode mixture, any suitable known binder may be used. Alternatively, any suitable known binder may be added to the aforementioned cathode mixture.

In the present embodiment, the $LiFePO_4$ carbon composite material is used as the cathode active material. However, the present invention is not limited thereto. In the present invention, $LiFePO_4$ by itself may be used as the cathode active material, or a compound represented by the general formula $Li_xFe_{1-y}M_yPO_4$ of the olivinic structure and which is different from $LiFePO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, may be used as the cathode active material either singly or in combination with other materials. These compounds may be enumerated by, for example, $LiFe_{0.2}Mn_{0.8}PO_4$, $LiFe_{0.2}Cr_{0.8}PO_4$, $LiFe_{0.2}Co_{0.8}PO_4$, $LiFe_{0.2}Cu_{0.8}PO_4$, $LiFe_{0.2}Ni_{0.8}PO_4$, $LiFe_{0.25}V_{0.75}PO_4$, $LiFe_{0.25}Mo_{0.75}PO_4$, $LiFe_{0.25}Ti_{0.75}PO_4$, $LiFe_{0.3}Zn_{0.7}PO_4$, $LiFe_{0.3}Al_{0.7}PO_4$, $LiFe_{0.3}Ga_{0.7}PO_4$, $LiFe_{0.25}Mg_{0.75}PO_4$, $LiFe_{0.25}B_{0.75}PO_4$ and $LiFe_{0.25}Nb_{0.75}PO_4$.

In preparing the anode material 3, the anode active material and the cathode active material are first dispersed in a solvent to form a slurried anode mixture. The so produced anode mixture is evenly coated on the anode current collector and dried in situ to form a layer of the anode active material to prepare the anode material 3. As the binder for the anode mixture, any suitable known binder may be used. Alternatively, any suitable known binder may be added to the anode mixture.

The width-wise dimension of the anode material 3 is selected to be larger than that of the cathode material 2. Preferably, the anode material 3 is formed to be 0.05 to 2.0 mm broader in width than the cathode material 2.

The cathode material 2 and the anode material 3, thus produced, are layered together, via separator 4, and coiled together a plural number of times, to form the cell device 5 so that the ratio of the inner diameter d to the outer diameter D, that is d/D, will be such that $0.05 < d/D < 0.5$.

The non-aqueous electrolyte solution is prepared by dissolving an electrolyte salt in a non-aqueous solvent.

The cell device 5 is housed via insulating plate 13 in a cell can 6 into which the non-aqueous electrolyte solution then is charged. A lid 15 and a safety valve device 16 are caulked together to the cell can 6 via gasket 14 to complete the non-aqueous electrolyte cell 1.

EXAMPLES

The present invention is now explained with reference to specified Examples based on experimental results.

First, sample cells of the Examples and Comparative Examples, with various values of the ratio of the inner diameter d to the outer diameter D of the cell device, were prepared to evaluate the discharge capacity and the capacity upkeep ratio.

Example 1

First, a lithium phosphorus oxide ($LiFePO_4$), as a cathode active material, was prepared under the following conditions:

Lithium phosphate and iron oxide II octahydrate were mixed so that the lithium to iron element ratio is 1:1, and acetylene black powders were added in an amount corresponding to 10% of the entire material for sintering, in order to yield a sample mixture. This sample mixture was charged into an alumina vessel and milled with a planetary ball mill under the conditions of the sample to alumina ball weight ratio of 50%, rotational velocity of 250 rpm and the driving time of 10 hours. The milled mass then was sintered at 600° C. for five hours in an electrical oven in a ceramic crucible to yield $LiFePO_4$.

Using the so obtained $LiFePO_4$ as cathode active material, $LiFePO_4$ and polyvinylidene fluoride as fluorine resin powders as a binder were mixed at a weight ratio of 95:5 to yield a cathode mixture, which was then dispersed in N-methyl pyrrolidone as a solvent to give a slurried cathode mixture. This slurried cathode mixture was coated evenly on both surfaces of a strip-shaped aluminum foil, which proves a cathode current collector, 20 μm in thickness and 33.5 mm in. width, and was dried in situ. The resulting dried product was compression molded in a roll press to yield a strip-shaped cathode material. In this cathode material, the cathode active material is coated on both sides of the cathode current collector to approximately the same film thickness, with the sum of the film thicknesses on both sides being 200 μm.

Pulverized pitch coke, used as an anode active material, and polyvinylidene fluoride, as a binder, were mixed together at a weight ratio of 90:10, to prepare an anode mixture, which then was dispersed in N-methyl pyrrolidone as a solvent to form a slurried anode mixture. This slurried anode mixture was coated evenly on both sides of a strip-shaped copper foil, which proves an anode current collector, 10 μm in thickness and 35.0 mm in width, and was dried in situ. The resulting dried product was compression molded, as in the case of the cathode mixture, in a roll press, to prepare a strip-shaped anode material. Meanwhile, in this anode material, the anode active material is formed to approximately the same film thickness on both sides of the anode active material, with the sum of the film thicknesses on both sides being 200 μm.

The anode material and the cathode material, thus prepared, are layered, via a pair of separators of micro-porous polypropylene, 25 μm in thickness, in the order of the anode mixture, separator, cathode material and the separator, and wound spirally a plural number of times to form a coil device. The cell device was prepared so that its inner diameter d and its outer diameter D will be 2.0 mm and 13.2 mm, respectively, with the ratio of the inner diameter d to the outer diameter D or d/D being 0.152.

After mounting insulating plates on the upper and lower surfaces of the cell device, prepared as described above, the cell device was housed in a cell can. A cathode lead, mounted on the anode mixture, was derived from the anode material and welded to the cell can. An anode lead, mounted on the anode material, was also derived from the anode material and welded to the cell can. An electrolyte solution obtained on mixing propylene carbonate, into which lithium phosphate hexafluoride was dissolved at a rate of 1 mol/l, with 1,2-dimethoxyethane, was charged into the cell can until the cathode and anode materials and the separator were wetted sufficiently. The cell can and a lid were caulked together via a gasket and sealed together.

In this manner, a cylindrically-shaped cell with outer and inner diameters of 13.8 mm and 13.3 mm, respectively, and a height of 42 mm, were prepared.

Example 2

A cylindrically-shaped cell was prepared in the same way as in Example 1 except setting the inner diameter d to 4.0 mm and the ratio of the inner diameter d to the outer diameter D, or d/D, to 0.303.

Comparative Example 1

A cylindrically-shaped cell was prepared in the same way as in Example 1 except setting the inner diameter d to 0.6 mm and the ratio of the inner diameter d to the outer diameter D, or d/D, to 0.046.

Comparative Example 2

A cylindrically-shaped cell was prepared in the same way as in Example 1 except setting the inner diameter d to 7.0 mm and the ratio of the inner diameter d to the outer diameter D, or d/D, to 0.530.

These four cells of the Examples 1 and 2 and the Comparative Examples 1 and 2 were tested as to charging/discharging cycles of charging for three hours with the current of 190 mA up to an upper limit voltage of 4.2V and discharging with the current of 150 mA up to the terminating voltage of 2.5V, and the discharge capacity at the tenth cycle where the charging/discharging capacity was stabilized was measured for each cell. On the other hand, this test on charging/discharging cycles was carried out 100 cycles and the ratio of the discharge capacity after 100 cycles to the discharge capacity after ten cycles was calculated for each cell as a capacity upkeep ratio. The results are also shown in Table 1.

TABLE 1

|  | Ex. 1 | Ex.2 | Comp. Ex. 1 | Comp. Ex. 2 |
| --- | --- | --- | --- | --- |
| inner diameter d (mm) | 2.0 | 4.0 | 0.6 | 7.0 |
| outer diameter D (mm) | 13.2 | 13.2 | 13.2 | 13.2 |
| d/D | 0.152 | 0.303 | 0.046 | 0.530 |
| weight of cathode material (g) | 3.7 | 2.5 | 4.4 | 1.1 |
| weight of anode material (g) | 2.5 | 1.7 | 3.0 | 0.8 |
| discharge capacity (mAh) | 350 | 307 | 231 | 143 |
| capacity upkeep ratio (%) | 92.6 | 94.3 | 72.3 | 90.2 |

If, in a non-aqueous electrolyte cell, practically useful cell characteristics are considered, it is desirable that the discharge capacity after ten cycles be not less than 200 mAh and that the capacity upkeep ratio after 100 cycles be not less than 80%. In this consideration, the discharge capacity and the capacity upkeep ratio were evaluated.

In Table 1, in the cell of the Comparative Example 1 where the ratio of the inner diameter to the outer diameter of the cell or d/D is not less than 0.5, the capacity upkeep ratio is not less than 90%. However, since the amount of the cathode active material and the anode active material introduced are smaller than those of the other sample cells, the discharge capacity is extremely small and not larger than 200 mAh. In the sample cell of Comparative Example 1 where the ratio of the inner diameter to the outer diameter of the cell or d/D is not larger than 0.05, the discharge capacity is not less than 200 mAh, however, the electrochemical properties of the active material are deteriorated due to volumetric changes of the cell device at the time of charging/discharging, or the active material is peeled off or detached, with the result that the capacity upkeep ratio is lower than that of the other sample cells and is not larger than 80%.

Conversely, with the sample cells of Examples 1 and 2 where the ratio of the inner diameter to the outer diameter of the cell or d/D is not less than 0.05 and less than 0.5, the discharge capacity is not less than 300 mAh, while the capacity upkeep ratio after 100 cycles exceeded 90%. These values are sufficient in view of characteristics of practically usable cells.

Several cells were prepared as the difference between the width of the anode material and that of the cathode material was changed, and evaluation was made of the discharge capacity and the capacity upkeep ratio by the above-described method. The results are shown in Table 2.

Example 3

A cylindrically-shaped cell was prepared in the same way as in Example 1 except using a cathode material having a width of 31 mm.

Example 4

A cylindrically-shaped cell was prepared in the same way as in Example 1 except using a cathode material having a width of 34 mm.

Example 5

A cylindrically-shaped cell was prepared in the same way as in Example 1 except using a cathode material having a width of 34.9 mm.

Comparative Example 3

A cylindrically-shaped cell was prepared in the same way as in Example 1 except using a cathode material having a width of 35 mm.

Comparative Example 4

A cylindrically-shaped cell was prepared in the same way as in Example 1 except using a cathode material having a width of 35 mm, and an anode material having a width of 33 mm.

TABLE 2

|  | Ex. 1 | Ex. 3 | Ex. 4 | Ex. 5 | Comp. Ex. 3 | Comp. Ex. 4 |
|---|---|---|---|---|---|---|
| width of cathode material (mm) | 33.5 | 31 | 34 | 34.9 | 35 | 35 |
| width of anode material (mm) | 35 | 35 | 35 | 35 | 35 | 35 |
| (anode material width-cathode material width)/2 (mm) | 0.75 | 2 | 0.5 | 0.05 | 0 | −1 |
| discharge capacity (mAh) | 350 | 328 | 366 | 382 | 282 | 274 |
| capacity upkeep ratio (%) | 92.6 | 92.8 | 91.3 | 89.2 | 75.2 | 53.4 |

If, in a non-aqueous electrolyte cell, practically useful cell characteristics are considered, it is desirable that the discharge capacity after ten cycles be not less than 200 mAh and that the capacity upkeep ratio after 100 cycles be not less than 80%. In this consideration, the discharge capacity and the capacity upkeep ratio were evaluated.

As may be seen from Table 2, the discharge capacity of the cells of the Comparative Examples 3 and 4, where the width of the anode plate is the same as or smaller than that of the cathode plate, the discharge capacity is not less than 200 mAh, however, these cells are lower in discharge capacity than the cells of the Examples. Moreover, with the cells of the Comparative Examples 3 and 4, the capacity upkeep ratio is not larger than 80%. Conversely, the cells of the Examples 3 to 5, where the width of the anode plate is larger than that of the cathode plate, the discharge capacity and the capacity upkeep ratio are not less than 300 mAh and not less than 80%, respectively, which are sufficient values of the discharge capacity in view of the practically useful cell characteristics.

The above six cells are disintegrated in the charged state. It was found that, with the cells of the Comparative Examples 3 and 4 where the capacity upkeep ratio is not larger than 80%, metal lithium was precipitated especially in the vicinity of both axial ends of the anode. Conversely, with the cells of the Examples 1 and 3 to 5 where the width of the anode material is larger than the width of the cathode material, no metal lithium was seen to be precipitated on the anode. That is, by setting the width of the anode plate so as to be larger than the width of the cathode plate, it is possible to suppress precipitation of metal lithium which might interfere with the charging/discharging reaction.

The above results indicate that, in the non-aqueous electrolyte cell, the discharge capacity as well as the capacity upkeep ratio can be improved to maintain the charging/discharging cycle life by forming the anode material so as to be broader in width than the cathode material. In the case of a cell in which one side of the anode material is broader in width by 2.0 mm than the cathode material, a sufficient discharge capacity may be maintained, however, the proportion in the cell device of the wasteful anode active material not contributing to the cell reaction is increased. Thus, the anode material is preferably broader in a range from 0.05 mm to 2.0 mm with respect to the cathode material, in which case the cell may be of a large discharge capacity and a high capacity upkeep ratio.

Cells of Examples 6 to 19, shown below, were fabricated, and evaluation was made of the discharge capacity and the capacity upkeep ratio thereof by the above-described methods.

Example 6

A cell was prepared under the same condition as that for the cell of Example 1 except using $LiFe_{0.2}Mn_{0.8}PO_4$ as the cathode active material in place of the $LiFePO_4$.

Example 7

A cell was prepared under the same condition as that for the cell of Example 1 except using $LiFe_{0.2}Cr_{0.8}PO_4$ as the cathode active material in place of the $LiFePO_4$.

Example 8

A cell was prepared under the same condition as that for the cell of Example 1 except using $LiFe_{0.2}Co_{0.8}PO_4$ as the cathode active material in place of the $LiFePO_4$.

Example 9

A cell was prepared under the same condition as that for the cell of Example 1 except. using $LiFe_{0.2}Cu_{0.8}PO_4$ as the cathode active material in place of the $LiFePO_4$.

Example 10

A cell was prepared under the same condition as that for the cell of Example 1 except using $LiFe_{0.2}Ni_{0.8}PO_4$ as the cathode active material in place of the $LiFePO_4$.

Example 11

A cell was prepared under the same condition as that for the cell of Example 1 except using $LiFe_{0.25}V_{0.75}PO_4$ as the cathode active material in place of the $LiFePO_4$.

Example 12

A cell was prepared under the same condition as that for the cell of Example 1 except using $LiFe_{0.25}Mo_{0.75}PO_4$ as the cathode active material in place of the $LiFePO_4$.

Example 13

A cell was prepared under the same condition as that for the cell of Example 1 except using $LiFe_{0.25}Ti_{0.75}PO_4$ as the cathode active material in place of the $LiFePO_4$.

Example 14

A cell was prepared under the same condition as that for the cell of Example 1 except using $LiFe_{0.3}Zn_{0.7}PO_4$ as the cathode active material in place of the $LiFePO_4$.

Example 15

A cell was prepared under the same condition as that for the cell of Example 1 except using $LiFe_{0.3}Al_{0.7}PO_4$ as the cathode active material in place of the $LiFePO_4$.

Example 16

A cell was prepared under the same condition as that for the cell of Example 1 except using $LiFe_{0.3}Ga_{0.7}PO_4$ as the cathode active material in place of the $LiFePO_4$.

Example 17

A cell was prepared under the same condition as that for the cell of Example 1 except using $LiFe_{0.25}Mg_{0.75}PO_4$ as the cathode active material in place of the $LiFePO_4$.

Example 18

A cell was prepared under the same condition as that for the cell of Example 1 except using $LiFe_{0.25}B_{0.75}PO_4$ as the cathode active material in place of the $LiFePO_4$.

Example 19

A cell was prepared under the same condition as that for the cell of Example 1 except using $LiFe_{0.25}Nb_{0.75}PO_4$ as the cathode active material in place of the $LiFePO_4$.

Of the cells of Examples 6 to 19, evaluation was made of the discharge capacity and the capacity upkeep ratio. It was found that the favorable results similar to those for the Example 1 could be produced.

What is claimed is:

1. A non-aqueous electrolyte cell comprising:
   a cell device including a strip-shaped cathode material and a strip-shaped anode material, which are layered with a separator therebetween and coiled only around itself a plural number of times;
   a non-aqueous electrolyte solution; and
   a cylindrically-shaped cell can for accommodating the cell device and the non-aqueous electrolyte solution,
   wherein,
   said cathode material employs a cathode active material containing a compound of an olivinic structure represented by a general formula $Li_xFe_{1-y}M_yPO_4$, where M is at least one selected from a group consisting of Mn, Cr, Co, Cu, Ni, V, Mo, Ti, Zn, Al, Ga, Mg, B and Nb, with $0.05 \leq x \leq 1.2$ and $0.1 \leq y \leq 0.8$, which compound is used either singly or in combination with other materials; and
   said non-aqueous electrolyte cell device is a coiled tubular structure with an unrestrained inner diameter d and an outer diameter D subject to the following relationship: $0.05 < d/D < 0.5$.

2. The non-aqueous electrolyte cell according to claim 1 wherein said cathode active material is a composite material composed of $LiFePO_4$ and a carbon material.

3. The non-aqueous-electrolyte cell according to claim 1 wherein said cathode active material is $LiFe_{0.2}Mn_{0.8}PO_4$, $LiFe_{0.2}Cr_{0.8}PO_4$, $LiFe_{0.2}Co_{0.8}PO_4$, $LiFe_{0.2}Cu_{0.8}PO_4$, $LiFe_{0.2}Ni_{0.8}PO_4$, $LiFe_{0.25}V_{0.75}PO_4$, $LiFe_{0.25}Mo_{0.75}PO_4$, $LiFe_{0.25}Ti_{0.75}PO_4$, $LiFe_{0.3}Zn_{0.7}PO_4$, $LiFe_{0.3}Al_{0.7}PO_4$, $LiFe_{0.3}Ga_{0.7}PO_4$, $LiFe_{0.25}Mg_{0.75}PO_4$, $LiFe_{0.25}B_{0.75}PO_4$ or $LiFe_{0.25}Nb_{0.75}PO_4$.

4. The non-aqueous electrolyte cell according to claim 2 wherein said carbon material is an amorphous carbon material such as acetylene black.

5. The non-aqueous electrolyte cell according to claim 1 wherein said anode active material of said anode material is a material capable of doping/dedoping lithium.

6. The non-aqueous electrolyte cell according to claim 1 wherein the anode active material of said anode material is metal lithium, lithium alloys, lithium-doped electrically conductive high molecular materials, or a layered compound of carbon materials or metal oxides.

7. The non-aqueous electrolyte cell according to claim 1 wherein the anode material is broader in width than the cathode material.

8. The non-aqueous electrolyte cell according to claim 1 wherein the anode material is broader in width by 0.05 to 2.0 mm on each side than the cathode material.

* * * * *